United States Patent
Kontz

(10) Patent No.: US 9,891,605 B2
(45) Date of Patent: Feb. 13, 2018

(54) GRADE CONTROL CLEANUP PASS USING VOLUME CONSTRAINTS

(71) Applicant: Caterpillar Inc., Peoria, IL (US)

(72) Inventor: Matthew E. Kontz, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 715 days.

(21) Appl. No.: 14/453,375

(22) Filed: Aug. 6, 2014

(65) Prior Publication Data

US 2016/0040392 A1 Feb. 11, 2016

(51) Int. Cl.
*G05B 15/02* (2006.01)
*E02F 3/84* (2006.01)

(52) U.S. Cl.
CPC ........... *G05B 15/02* (2013.01); *E02F 3/84* (2013.01); *E02F 3/841* (2013.01)

(58) Field of Classification Search
CPC .................................. G05B 15/02; E02F 3/84
See application file for complete search history.

(56) References Cited

U.S. PATENT DOCUMENTS

| | | | | |
|---|---|---|---|---|
| 6,167,336 A * | 12/2000 | Singh | ...................... | E02F 3/434 172/2 |
| 6,880,643 B1 * | 4/2005 | Zimmerman | ............. | E02F 3/84 172/4.5 |
| 8,620,535 B2 | 12/2013 | Friend et al. | | |
| 2003/0069679 A1 * | 4/2003 | Keefer | .................. | E02F 9/2045 701/50 |
| 2003/0195687 A1 * | 10/2003 | Keefer | .................... | E02F 3/842 701/50 |
| 2010/0250023 A1 * | 9/2010 | Gudat | ................... | E02F 9/2045 701/2 |
| 2012/0136508 A1 * | 5/2012 | Taylor | ................... | E02F 9/2045 701/2 |
| 2012/0143572 A1 * | 6/2012 | Williams | ................. | G06N 3/12 703/1 |
| 2013/0311031 A1 * | 11/2013 | Friend | .................. | G05D 1/0278 701/26 |
| 2014/0012404 A1 | 1/2014 | Taylor et al. | | |
| 2014/0088838 A1 * | 3/2014 | Furem | .................... | B65G 67/04 701/50 |
| 2014/0174770 A1 | 6/2014 | Wei et al. | | |
| 2014/0324291 A1 * | 10/2014 | Jones | .................... | E02F 9/2045 701/41 |

* cited by examiner

*Primary Examiner* — Charles E Anya
(74) *Attorney, Agent, or Firm* — Miller, Matthias & Hull; L. Glenn Waterfield

(57) ABSTRACT

A computer-implemented method for determining a cleanup pass profile is provided. The method may include identifying a pass target extending from a first end to a second end along a work surface, determining one or more volume constraints based at least partially on machine load limits and volume differentials between the pass target and the work surface, generating a plurality of primitives between the first end and the second end based on the volume constraints, and adjoining the primitives to form a substantially continuous cleanup pass profile.

20 Claims, 4 Drawing Sheets

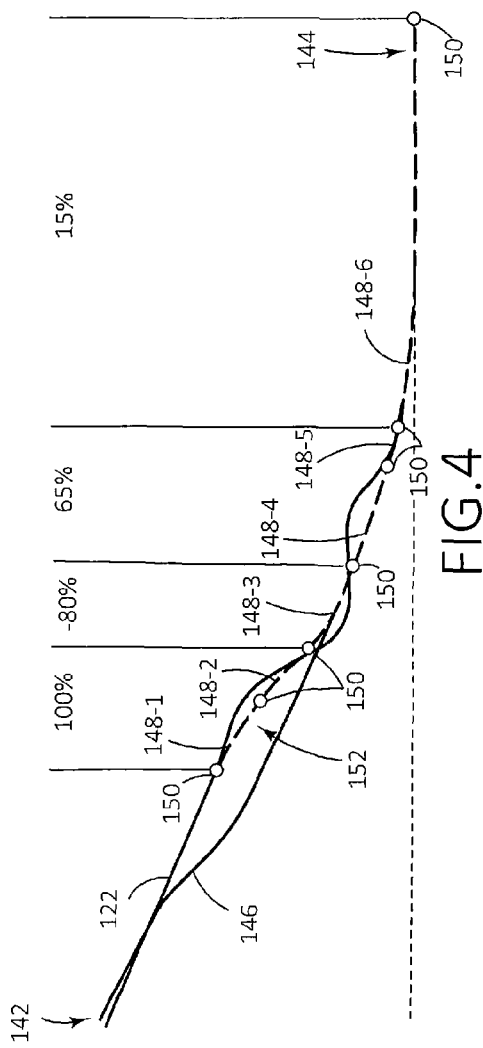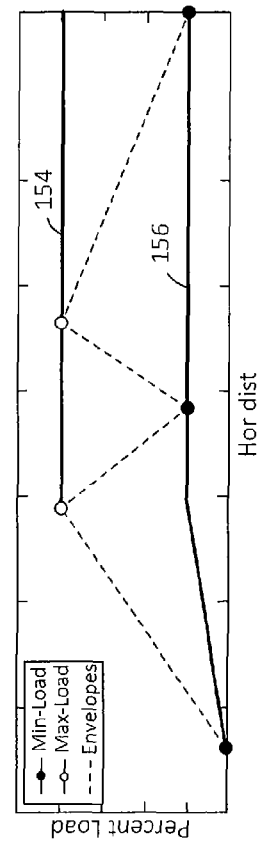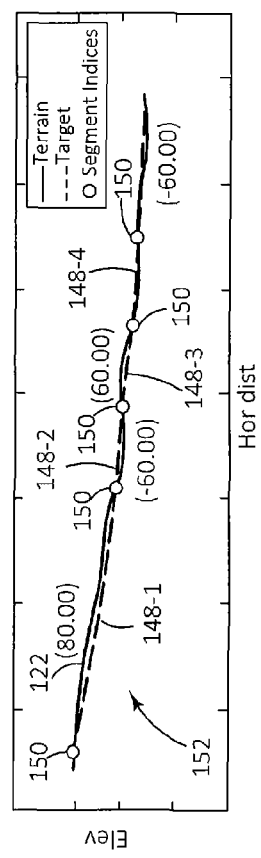

GRADE CONTROL CLEANUP PASS USING VOLUME CONSTRAINTS

TECHNICAL FIELD

The present disclosure relates generally to controlling machines, and more particularly, to systems and methods for determining cleanup pass profiles for semi-autonomous and autonomous machines using volume constraints.

BACKGROUND

Machines such as, for example, track-type tractors, dozers, motor graders, wheel loaders, and the like, are used to perform a variety of tasks. For example, these machines may be used to move material and/or alter work surfaces at a worksite. The machines may be manned machines, but may also be autonomous or semi-autonomous vehicles that perform these tasks in response to commands remotely or locally generated as part of a work plan for the machines. The machines may receive instructions in accordance with the work plan to perform operations, including digging, loosening, carrying, and any other manipulation of materials at the worksite.

It may be desirable to ensure that the machines perform these operations such that the materials are moved in an efficient manner. More particularly, in repetitive operations, it may be especially desirable to ensure that the locations at which the machines begin to alter the work surface, or the profiles along which the machines alter the work surface, are selected in a way that maximizes efficiency and productivity. Some conventional systems, such as disclosed in U.S. Pat. Appl. Publ. No. 2014/0012404, published on Jan. 9, 2014 and entitled "Methods and Systems for Machine Cut Planning," plan cut locations based on predetermined cut volume estimations. While such techniques may greatly assist in the planning processes and the overall excavation, there is still room for improvement.

A standard cut profile in autonomous dozing is generally composed of three regions, including a blade-in-air region, a blade-load region, and a blade-carry region. In the blade-in-air region, a dozer is typically reversing after a cut and positioning a blade implement to make contact with the work surface. Once contact is made with the work surface and a cut is initiated, the blade is loaded with material in the blade-load region and generally moved downward to a target carry surface. In the blade-carry region, the blade carries the loaded material to a crest of the worksite. As this process is repeated, the work surface elevation gradually changes and the profile of the blade-load region is updated accordingly. However, autonomous carry passes often adjust the blade height while in the blade-carry region which can result in unwanted deviations from the planned profile.

Theoretically, conventional cut and carry passes, along with occasional ripping passes, may be repeated to execute clean passes according to the planned profile and avoid unwanted deviations. In actual practice, however, cut and carry passes may deviate from the planned profile due to factors such as hard soil, insufficient ripping, degradations in position estimation, hump building, large rocks, boulders or other embedded obstacles, and the like. Limitations in the actual process of planning for conventional cut and carry passes are also factors. For instance, conventional processes are limited to profiles formed using S-shaped Gaussian curves, which cannot sufficiently adapt to negative volumes or valleys in the terrain that dip below the target profile, bumps in the terrain that extend above the pass target, or the like.

Accordingly, there is a need for grade control or cleanup passes that can reduce inconsistencies in the terrain, minimize operator involvement, and help improve productivity of the overall excavation. Furthermore, there is a need for cleanup pass profiling systems and methods that provide more versatile means for correcting surface irregularities, such as by shaving, snaking or otherwise cutting bumps and/or small valleys. The present disclosure is directed at addressing one or more of the inefficiencies and disadvantages set forth above. However, it should be appreciated that the solution of any particular problem is not a limitation on the scope of this disclosure or of the attached claims except to the extent express noted.

SUMMARY OF THE DISCLOSURE

In one aspect of the present disclosure, a computer-implemented method for determining a cleanup pass profile is provided. The method may include identifying a pass target extending from a first end to a second end along a work surface, determining one or more volume constraints based at least partially on machine load limits and volume differentials between the pass target and the work surface, generating a plurality of primitives between the first end and the second end based on the volume constraints, and adjoining the primitives to form a substantially continuous cleanup pass profile.

In another aspect of the present disclosure, a control system for determining a cleanup pass profile is provided. The control system may include a memory configured to retrievably store one or more algorithms, and a controller in communication with the memory. The controller, based on the one or more algorithms, may be configured to at least identify a pass target extending from a first end to a second end along a work surface, determine one or more volume constraints based at least partially on machine load limits and volume differentials between the pass target and the work surface, generate a plurality of primitives between the first end and the second end based on the volume constraints, and adjoin the primitives to form a substantially continuous cleanup pass profile.

In yet another aspect of the present disclosure, a controller for determining a cleanup pass profile is provided. The controller may include a pass target identification module configured to identify a pass target extending from a first end to a second end along a work surface, a volume constraint module configured to determine one or more volume constraints based at least partially on machine load limits and volume differentials between the pass target and the work surface, a primitive generation module configured to generate a plurality of primitives between the first end and the second end based on the volume constraints, and a cleanup pass profile module configured to adjoin the primitives at the endpoints to form a substantially continuous cleanup pass profile.

BRIEF DESCRIPTION OF THE DRAWINGS

FIG. 4 is a diagrammatic illustration of an exemplary cleanup pass profile that may be generated by a control system of the present disclosure using primitives defined by volume constraints;

FIG. 5 is a diagrammatic illustration of upper and lower envelopes being used to represent machine load limits generated by a control system of the present disclosure;

FIG. 6 is a diagrammatic illustration of another exemplary cleanup pass profile that may be generated by a control system of the present disclosure using primitives defined by volume constraints.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
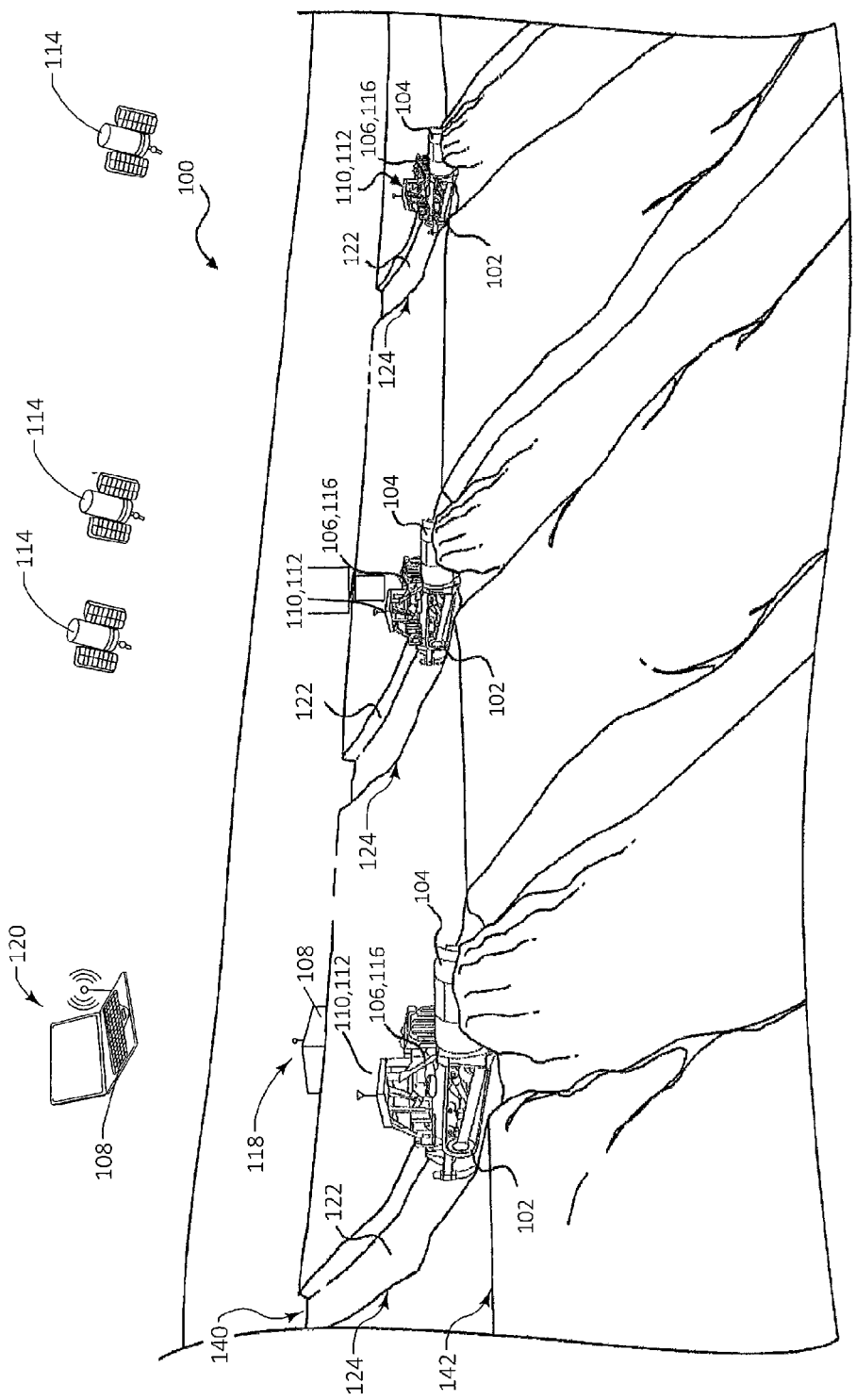
FIG. 1 is a pictorial illustration of an exemplary disclosed worksite.

Referring now to FIG. 1, one exemplary worksite 100 is illustrated with one or more machines 102 performing predetermined tasks. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machines 102 depicted in FIG. 1, for example, may embody earth moving machines, such as dozers having blades or other work tools or implements 104 movable by way of one or more actuators 106. The machines 102 may also include manned machines or any type of autonomous or semi-autonomous machines.

The overall operations of the machines 102 and the machine implements 104 within the worksite 100 may be managed by a control system 108 that is at least partially in communication with the machines 102. Moreover, each of the machines 102 may include any one or more of a variety of feedback devices 110 capable of signaling, tracking, monitoring, or otherwise communicating relevant machine information to the control system 108. For example, each machine 102 may include a locating device 112 configured to communicate with one or more satellites 114, which in turn, may communicate to the control system 108 various information pertaining to the position and/or orientation of the machines 102 relative to the worksite 100. Each machine 102 may additionally include one or more implement sensors 116 configured to track and communicate position and/or orientation information of the implements 104 to the control system 108.

The control system 108 may be implemented in any number of different arrangements. For example, the control system 108 may be at least partially implemented at a command center 118 situated locally or remotely relative to the worksite 100 with sufficient means for communicating with the machines 102, for example, via satellites 114, or the like. Additionally or alternatively, the control system 108 may be implemented using one or more computing devices 120 with means for communicating with one or more of the machines 102 or one or more command centers 118 that may be locally and/or remotely situated relative to the worksite 100. In still further alternatives, the control system 108 may be implemented on-board any one or more of the machines 102 that are also provided within the worksite 100. Other suitable modes of implementing the control system 108 are possible and will be understood by those of ordinary skill in the art.

Using any of the foregoing arrangements, the control system 108 may generally be configured to monitor the positions of the machines 102 and/or machine implements 104 relative to the worksite 100 and a predetermined target operation, and provide instructions for controlling the machines 102 and/or machine implements 104 in an efficient manner in executing the target operation. In certain embodiments, the machines 102 may be configured to excavate areas of a worksite 100 according to one or more predefined excavation plans. The excavation plans can include, among other things, determining the location, size, and shape of a plurality of cuts into an intended work surface 122 at the worksite 100 along one or more slots 124. In such embodiments, the control system 108 may be used to plan not only the overall excavation, but also to plan intermittent grade control or cleanup passes within the slots 124 or any other areas of the work surface 122. For a given work surface 122 and pass target, for instance, the control system 108 may generate a cleanup pass profile best suited to remove surface irregularities, such as smaller bumps and valleys in the work surface 122, which may adversely affect the autonomous or semi-autonomous performance of the overall excavation. Although described in connection with grade control or cleanup pass planning and profiling, the control system 108 may similarly be employed in conjunction with other types of tasks.

Figure 2:
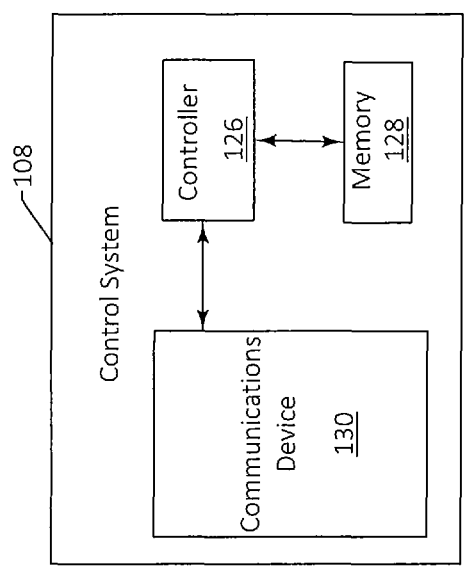
FIG. 2 is a diagrammatic illustration of an exemplary control system that may be used at a worksite.

Turning to FIG. 2, one exemplary embodiment of a control system 108 that may be used in conjunction with the worksite 100 and the machines 102 of FIG. 1 is diagrammatically provided. As shown, the control system 108 may generally include, among other things, a controller 126, a memory 128, and a communications device 130. More specifically, the controller 126 may be configured to operate according to one or more algorithms that are retrievably stored within the memory 128. The memory 128 may be provided on-board relative to the controller 126, external to the controller 126, or otherwise in communication therewith. The communications device 130 may be configured to enable the controller 126 to communicate with one or more of the machines 102, and receive information pertaining to the position and/or orientation of the machines 102 and the machine implements 104, for example, via satellites 114, or any other suitable means of communication. Moreover, the controller 126 may be implemented using any one or more of a processor, a microprocessor, a microcontroller, or any other suitable means for executing instructions stored within the memory 128. Additionally, the memory 128 may include non-transitory computer-readable medium or memory, such as a disc drive, flash drive, optical memory, read-only memory (ROM), or the like.

Figure 3:
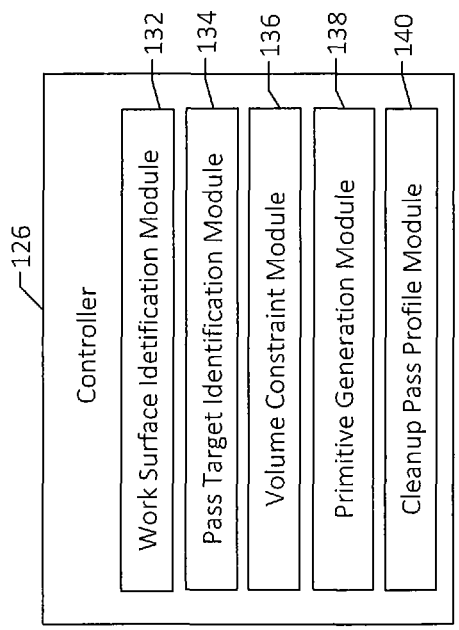
FIG. 3 is a diagrammatic illustration of an exemplary controller that may be used at a worksite.

As further shown in FIG. 3, the controller 126 may be configured to at least determine a grade control or cleanup pass profile at a worksite 100 according to one or more preprogrammed algorithms which may be generally categorized into, for example, a work surface identification module 132, a pass target identification module 134, a volume constraint module 136, a primitive generation module 138, and a cleanup pass profile module 140. With further reference to the exemplary diagram of FIG. 4, the work surface identification module 132 may configure the controller 126 to initially identify the work surface 122 to be worked on, such as in terms of position relative to the worksite 100, position relative to the machines 102, elevation, slope, volume of material moved, removed or remaining, terrain composition, or any other relevant geographical profile. As shown for example in FIG. 4, a given work surface 122 may generally be defined as the section of terrain along a slot 124 extending between an alignment gap 142 at a first end and a crest 144 at the second end. Information pertaining to the work surface 122 and/or changes thereto may be communicated to the controller 126 via manual entries, preprogrammed entries, periodically updated entries, real-time entries, or any combination thereof. Moreover, the work surface identification module 132 may configure the controller 126 to map the work surface 122 in two-dimensional formats, such as shown in FIG. 4, or in other alternatives, in three-dimensional formats.

The pass target identification module 134 of FIG. 3 may configure the controller 126 to identify the carry surface or pass target 146 that is ultimately desired. As with the work surface identification module 132, the pass target identification module 134 may identify the pass target in terms of location or position relative to the worksite 100, position relative to the machines 102, position relative to the work surface 122, elevation, slope, volume differential with the work surface 122, terrain composition, or any other relevant geographical profile. Additionally, the pass target 146 may generally extend the length of the work surface 122 between the alignment gap 142 and the crest 144. The pass target 146 may be identified using any number of different techniques. As shown for instance in FIG. 4, the pass target 146 may be identified or defined based on a two-dimensional user-defined curve that is positioned, superimposed or otherwise mapped relative to the work surface 122. Moreover, information defining the pass target 146 may be manually input, programmed or preprogrammed into the controller 126. In other alternative embodiments, the pass target 146 may be identified based on a two-dimensional cross-section or slice of a three-dimensional model of the pass target 146. In still further modifications, the controller 126 may be configured to identify the work surface 122 and the pass target 146 using three-dimensional models, or the like.

With both the work surface 122 and the pass target 146 identified, the volume constraint module 136 of FIG. 3 may configure the controller 126 to determine one or more volume constraints to be applied in planning a grade control or cleanup pass. In general, the volume constraints may be determined based on volume differentials between the work surface 122 and the pass target 146, as well as on load limits of the associated machines 102 and/or machine implements 104. In terms of volume differentials, the volume constraint module 136 may configure the controller 126 to calculate the volume of terrain or material to be removed from the work surface 122 and/or the volume of material to remain therein based on the given state of the work surface 122 and the pass target 146 as previously identified. In terms of machine load limits, the volume constraint module 136 may configure the controller 126 to assess the maximum and minimum load capacities that the machine 102 and the implement 104 should be limited to under the given circumstances. The controller 126 may assess machine load limits based on any number of different factors including, for example, the type of implement 104 being used, the dimensions and/or load capacity of the implement 104, the load capacity or other related specifications of the machine 102 being operated, the slope of the work surface 122 and/or pass target 146, the desired cut or fill depth, the hardness or composition of the terrain, and the like. The machine load limits may be assessed per pass, per primitive 148 and/or per group of primitives 148.

Additionally, the primitive generation module 138 of FIG. 3 may configure the controller 126 to generate a plurality of geometric primitives 148 that can ultimately be combined or adjoined at its endpoints 150 to construct the volume-based cleanup pass profile 152 for the given work surface 122 and pass target 146. More particularly, each primitive 148 may include a line, a parabola, a cubic, a polynomial, a Gaussian curve, an exponential function, or any geometric primitive that can be provided along the work surface 122 generally extending from the alignment gap 142 toward the crest 144 as shown in FIG. 4. Furthermore, each primitive 148 may be defined or constrained based on the slope and/or elevation of other adjoining primitives 148, adjoining work surfaces 122 and pass targets 146. The elevation or curve function of a given primitive 148 may be provided as, for example, $$y(x) = c_0 + c_1 x + \ldots + c_{m_k} x^{m_k} \quad (1)$$

and the slope or derivative of that function may be provided as, for example, $$\frac{\partial y}{\partial x} = c_1 + 2c_2 x + \ldots + m_k c_{m_k} x^{m_k - 1} \quad (2)$$

where m denotes the order of the polynomial making up the kth primitive, and c denotes the unknown polynomial coefficients to be resolved.

Each primitive 148 may be further defined based on, not only the slope and elevation of other adjoining primitives 148, adjoining work surfaces 122 and pass targets 146, but also the volume constraints as determined by the volume constraint module 136. Specifically, the volume differentials may indicate the volume of terrain material that needs to be moved for a given pass, while the machine load limits may help further define the depth, elevation, slope or other parameters with which the machine 102 and the implement 104 should operate in order to efficiently move as much of the material as possible without overloading or underloading the machine 102. In one embodiment, the polynomial function of each primitive 148 may be defined by the volume constraint $$w_b \cdot \int_{d_{k-1}}^{d_k} y(x) \, dx = w_b \cdot \left( c_0 x + \frac{1}{2} c_1 x^2 + \ldots + \frac{1}{m_k + 1} c_{m_k} x^{m_k + 1} \Big|_{d_{k-1}}^{d_k} \right) \quad (3)$$

where $w_b$ may be a parameter or dimension of the implement 104 used, such as blade width, or the like, and where $d_k$ indicates the end of the kth primitive 148 while $d_{k-1}$ indicates the start of the kth primitive 148. Using mathematical relationships between a sufficient set of functions or constraints, such as those of equations (1)-(3), the polynomial coefficients that define each primitive 148 may be determined for a given pass. For instance, in a pass with n number of primitives 148, solving a set of 2(n−1) equations may provide coefficients that will match the slope and elevation at the endpoints 150 of adjoining primitives 148, and solving a set of four equations may provide coefficients that will match the slope and elevation at the relevant endpoints 150 of the first and final primitives 148 to the work surface 122 or the pass target 146. Additionally, solving a corresponding set of (n−2) equations may provide coefficients that will constrain the shape of each primitive 148 to the target volume to be moved.

As shown for example in the embodiment of FIG. 4, each primitive 148 may be formed of a curve defined by a polynomial function that is defined in terms of both slope and elevation, as well as in accordance with volume constraints. In particular, the slope and elevation of the endpoints 150 of the first primitive 148-1 may be configured to match those of the work surface 122 at the alignment gap 142 adjacent thereto as well as those of the second primitive 148-2. Correspondingly, the slope and elevation of the endpoints 150 of the final primitive 148-6 may be configured to match those of the crest 144 adjacent thereto as well as those of the fifth primitive 148-5. The slope and elevation of the adjoined endpoints between the intermediate primitives 148-2, 148-3, 148-4, 148-5 may similarly be configured to match. As shown, each of the primitives 148 may be further defined based on volume constraints which serve to ensure the most efficient and productive passes for the given machine 102 and implement 104. For instance, the first primitive 148-1 and the second primitive 148-2 together may be designated as a cut region with a planned cut volume of 100% of the machine load. The third primitive 148-3 may be configured as a fill region with a planned fill volume of 80% of the load capacity. The fourth primitive 148-4 and the fifth primitive 148-5 may be configured together as cut regions with a 65% planned cut volume. The final primitive 148-6 may be designated as a cut region with a 15% planned cut volume. In such a way, the volume constraint module 136 and the primitive generation module 138 may maximize use of the available load capacity of the machine 102 and/or implement 104 without overloading it, and thereby generate a plurality of primitives 148 which combine to provide an efficient cleanup pass profile 152.

In other modifications, the volume constraint module 136 and the primitive generation module 138 may configure the controller 126 to define envelopes on the machine load limits, such as the upper envelope 154 and the lower envelope 156 shown in FIG. 5. Specifically, the upper envelope 154 may be defined as the lesser of the maximum load capacity of the machine 102 and/or implement 104, and the total volume of material to be moved for one or more remaining primitives 148. Correspondingly, the lower envelope 156 may be defined as the greater of the minimum load capacity of the machine 102 and/or implement 104, and the total volume of material remaining. As shown in FIG. 5, for example, the upper envelope 154 may be set to 80% and the lower envelope 156 may be set to 20%. Furthermore, as shown in the corresponding diagram of FIG. 6, the resulting primitives 148 may include, for example, a first primitive 148-1 having a planned cut volume that is 80% of the machine load, a second primitive 148-2 having a planned fill volume that is 60% of the machine load, a third primitive 148-3 having a planned cut volume that is 60% of the machine load, and a final primitive 148-4 having a planned fill volume that is 60% of the machine load. In such a way, the volume constraint module 136 and the primitive generation module 138 employs all of the available load capacity of the machine 102 and the implement 104 in a single pass as modified and defined by the upper and lower envelopes 154, 156.

Still further, the cleanup pass profile module 140 of FIG. 3 may configure the controller 126 to adjoin or spline the primitives 148 generated by the primitive generation module 138 and form the cleanup pass profile 152 for the given work surface 122 and pass target 146. More specifically, controller 126 may be configured to interrelate the polynomial or other curve functions associated with the individual primitives 148, such as via one or more mathematical relationships therebetween, in a manner which adjoins the endpoints 150 of the primitives 148. The controller 126 may further digitalize or otherwise translate functions pertaining to the resulting cleanup pass profile 152 into the appropriate instructions for execution by one or more of the machines 102 and/or implements 104 within the worksite 100. In particular, the instructions corresponding to the cleanup pass profile 152 may be transmitted by the communications device 130 to the appropriate machines 102 or implements 104, which may in turn, execute the cleanup pass accordingly. Other variations and modifications to the algorithms or methods will be apparent to those of ordinary skill in the art. One exemplary algorithm or method by which the controller 126 may be operated to determine a grade control or cleanup pass profile 152 based on volume constraints is discussed in more detail below.

INDUSTRIAL APPLICABILITY

In general, the present disclosure sets forth methods, devices and systems for volume-based planning and execution of grade control or cleanup passes where there are motivations to improve productivity and efficiency. Although applicable to any type of machine, the present disclosure may be particularly applicable to autonomously or semi-autonomously controlled dozing machines where the dozing machines are controlled along particular travel routes within a worksite to excavate materials. Moreover, the present disclosure may improve the overall excavation process by enabling more versatile and more precise grade control or cleanup passes. Furthermore, by providing for more versatile cleanup pass profiles that can be autonomously or semi-autonomously executed, unwanted irregularities in a given work surface may be efficiently corrected and deviations typically caused thereby may be significantly reduced.

Figure 7:
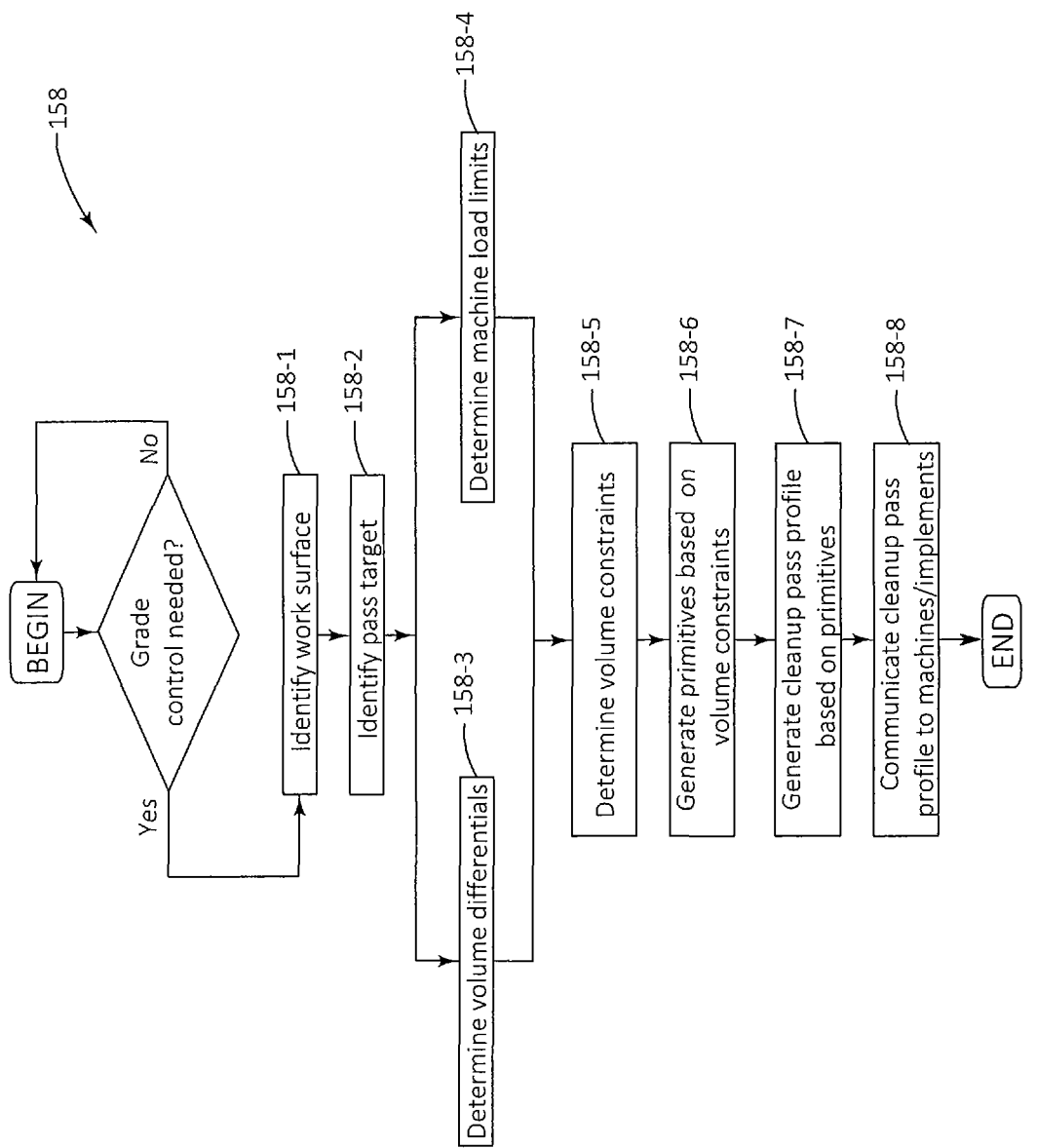
FIG. 7 is a flowchart depicting an exemplary disclosed method that may be performed by a control system of the present disclosure.

Turning now to FIG. 7, one exemplary algorithm or computer-implemented method 158 for determining a cleanup pass profile 152 is diagrammatically provided, according to which, for example, the control system 108 and the controller 126 may be configured to operate. As shown, the controller 126 may initially determine whether a grade control or cleanup pass is needed, such as by manual or autonomous means. For instance, a cleanup pass may be manually triggered in response to operator input remotely or locally entered via any one or more of the machines 102, command centers 118, computing devices 120, and the like. Alternatively, a cleanup pass may be autonomously triggered, for example, at predefined intervals of time and/or at predefined checkpoints pertaining to the geographical state of work surface 122. Predefined checkpoints may be defined based on any combination of the length of the given pass, the relative elevations of the alignment gap 142 and the crest 144, the slope, the volume of material moved, removed or remaining, and the like. In further alternatives, the control system 108 and the controller 126 may be configured to autonomously assess whether a cleanup pass is appropriate, for instance, based on any deviations in the tracked progress, position and/or orientation of the work machines 102 and implements 104.

If no trigger or request for a cleanup pass is detected, the controller 126 may continue monitoring for such triggers while resuming normal cut operations. If a valid request for a cleanup pass is determined, the controller 126 may begin planning a cleanup pass profile 152 that is most appropriate for the given work surface 122 and pass target 146 according to the algorithm or method 158 shown in FIG. 7. According to block 158-1, for example, the controller 126 may be configured to initially identify the work surface 122, such as in terms of position relative to the worksite 100, position relative to the machines 102, elevation, slope, volume of material moved, removed or remaining, terrain composition, or any other relevant geographical profile thereof. For a work surface 122 provided along a slot 124, as shown for instance in FIGS. 1 and 4, the controller 126 may additionally identify the locations of the alignment gap 142 and the crest 144. Moreover, the controller 126 may be configured to receive profile information relating to the work surface 122 and/or changes thereto via manual user input, preprogrammed input, periodically updated input, real-time input, or combinations thereof.

Once information regarding the work surface 122 has been sufficiently identified, mapped or otherwise obtained, the controller 126 may further identify the pass target 146 according to block 158-2 of FIG. 7. Specifically, the controller 126 may be configured to identify the pass target 146 in terms of position relative to the worksite 100, position relative to the machines 102, position relative to the work surface 122, elevation, slope, volume differential with the work surface 122, terrain composition, or any other relevant geographical profile. In general, the pass target 146 may extend the length of the work surface 122 between the alignment gap 142 and the crest 144. While the pass target 146 may be identified using any number of different techniques, the controller 126 may identify or define the pass target 146 based on a two-dimensional curve that is positioned, superimposed or otherwise mapped relative to the work surface 122, as shown for example in FIG. 4. Information regarding the pass target 146 may be manually input, programmed or preprogrammed into the controller 126, or alternatively, identified based on a two-dimensional cross-section or slice of a three-dimensional model of the pass target 146. In other alternatives, the controller 126 may be configured to identify the work surface 122 and the pass target 146 using three-dimensional models.

Having identified each of the given work surface 122 and the desired pass target 146, the controller 126 may be configured to determine volume differentials therebetween in block 158-3, as well as determine machine load limits in block 158-4. In block 158-3, for example, the controller 126 may be configured to calculate the volume of terrain or material to be removed from the work surface 122 and/or the volume of material to remain therein based on the given state of the work surface 122 and the pass target 146 relative thereto. In block 158-4, for example, the controller 126 may be configured to assess the maximum and minimum load capacities or volumes that the machine 102 and the implement 104 should be limited to under the given circumstances. The controller 126 may assess machine load limits based on any number of different factors including, for example, the type of implement 104 being used, the dimensions and/or load capacity of the implement 104, the load capacity or other related specifications of the machine 102 being operated, the slope of the work surface 122 and/or pass target 146, the desired cut or fill depths, the hardness or composition of the terrain, the number of cut and fill regions involved, and the like. The machine load limits may also be assessed per pass, per primitive 148 and/or per group of primitives 148.

Based on the volume differentials and the machine load limits, the controller 126 in block 158-5 of FIG. 7 may be configured to determine volume constraints to be applied to the primitives 148. More specifically, the controller 126 may be able to generate relationships, such as between equations (1)-(3), for defining not only the slope and elevation per primitive 148 or per group of primitives 148, but also for defining the target volume of material to be cut or filled per primitive 148 or per group of primitives 148. Once the appropriate set of equations or volume constraints have been determined, the controller 126 in block 158-6 may be configured to generate a plurality of primitives 148 which best comply with those constraints. For primitives 148 based on polynomial functions, for example, the controller 126 may be configured to solve for the unknown polynomial coefficients in a given set of equations which will define the specific shape, slope and elevation of each primitive 148, as well as the target volume of material to be cut or filled per primitive 148. As shown in the embodiment of FIG. 4, for example, the slope and elevation of each primitive 148 may be configured to match those of any adjoining primitive 148, work surface 122 or pass target 146, and the cut or fill volumes may be configured to ensure the most efficient and productive passes for the given machine 102 and implement 104. Moreover, the controller 126 may generate primitives 148 which will maximize use of the available load capacity of the machine 102 and/or implement 104 per cleanup pass without overloading it.

Once all appropriate constraints have been applied and once all primitives 148 have been generated, the controller 126 may be configured to adjoin adjacent primitives 148 and form the cleanup pass profile 152 for the given work surface 122 and pass target 146 in accordance with block 158-7 of FIG. 7. More specifically, the controller 126 may interrelate the polynomial or curve functions associated with the individual primitives 146, such as via one or more mathematical relationships therebetween, in a manner which adjoins the endpoints 150 of the primitive curves 148. The controller 126 may further digitalize or otherwise translate the resulting cleanup pass profile 152 into the appropriate instructions for execution by one or more of the machines 102 or implements 104 within the worksite 100. Additionally, the controller 126 may communicate instructions corresponding to the final cleanup pass profile 152, such as via the communications device 130, to the appropriate machines 102 and machine implements 104, according to block 158-8 of FIG. 7. Machines 102 or implements 104 receiving such instructions may then autonomously or semi-autonomously operate to execute the cleanup pass according to the cleanup pass profile 152 generated by the controller 126 in block 158-7.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A computer-implemented method for determining a current cleanup pass profile to be executed by an autonomous machine, comprising:
in response to determining that a cleanup pass is needed:
identifying a pass target extending from a first end to a second end along a work surface;
determining one or more volume constraints based at least partially on machine load limits and volume differentials between the pass target and the work surface for the current cleanup pass;
generating a plurality of primitives between the first end and the second end based on the volume constraints;
adjoining the primitives to form a substantially continuous cleanup pass profile that balances volume and machine load limits in a single cleanup pass; and
providing the cleanup pass profile to the autonomous machine to execute the cleanup pass.

2. The computer-implemented method of claim 1, wherein the machine load limits include a maximum load limit and a minimum load limit of an associated machine implement.

3. The computer-implemented method of claim 2, wherein the maximum load limit is further defined based on one or more of a slope of the pass target, a slope of the work surface, a relative depth of the work surface, and a hardness of the work surface.

4. The computer-implemented method of claim 2, wherein the first end of the pass target corresponds to an alignment gap of the work surface and the second end of the pass target corresponds to a crest of the work surface, the minimum load limit being further defined based on a desired minimum load at the crest.

5. The computer-implemented method of claim 2, wherein the maximum load limit and the minimum load limit is defined for each primitive.

6. The computer-implemented method of claim 2, wherein the maximum load limit is further defined by an upper envelope, and the minimum load limit is further defined by a lower envelope, each of the upper envelope and the lower envelope being calculated in part by a sum of positive volume differentials extending through the pass target.

7. The computer-implemented method of claim 1, wherein each primitive corresponds to one of a cut region having a positive volume differential and a fill region having a negative volume differential.

8. The computer-implemented method of claim 1, wherein the primitives are configured to form cleanup pass profiles compatible for use with one or more of negative volume regions, shave cuts, and snake cuts for multiple cut and fill regions.

9. A control system for determining a current cleanup pass profile to be executed by an autonomous machine, comprising:
a memory configured to retrievably store one or more algorithms; and
a controller in communication with the memory and, based on the one or more algorithms, configured to at least:
in response to determining that a cleanup pass is needed:
identify a pass target extending from a first end to a second end along a work surface,
determine one or more volume constraints based at least partially on machine load limits and volume differentials between the pass target and the work surface for the current cleanup pass,
generate a plurality of primitives between the first end and the second end based on the volume constraints,
adjoin the primitives to form a substantially continuous cleanup pass profile that balances volume and machine load limits in a single cleanup pass, and
provide the cleanup pass profile to the autonomous machine to execute the cleanup pass.

10. The control system of claim 9, wherein the controller further defines the machine load limits to include a maximum load limit and a minimum load limit of an associated machine implement, the controller defining the maximum load limit based on one or more of a slope of the pass target, a slope of the work surface, a relative depth of the work surface, and a hardness of the work surface.

11. The control system of claim 10, wherein the first end of the pass target corresponds to an alignment gap of the work surface and the second end of the pass target corresponds to a crest of the work surface, the controller defining the minimum load limit based on a desired minimum load at the crest.

12. The control system of claim 9, wherein the controller further defines the machine load limits to include a maximum load limit and a minimum load limit of an associated machine implement, the controller further defining the maximum load limit using an upper envelope and the minimum load limit using a lower envelope, each of the upper envelope and the lower envelope being calculated in part by a sum of positive volume differentials extending through the pass target.

13. The control system of claim 9, wherein each primitive corresponds to one of a cut region having a positive volume differential and a fill region having a negative volume differential.

14. A controller for determining a current cleanup pass profile to be executed by an autonomous machine, comprising:
a module configured to in response to determining that a cleanup pass is needed, identify a pass target extending from a first end to a second end along a work surface;
a module configured to determine one or more volume constraints based at least partially on machine load limits and volume differentials between the pass target and the work surface;
a module configured to generate a plurality of primitives between the first end and the second end based on the volume constraints;
a module configured to adjoin the primitives at the endpoints to form a substantially continuous cleanup pass profile that balances volume and machine load limit in a single cleanup pass; and
wherein said controller provides the cleanup pass profile to the autonomous machine to execute the cleanup pass.

15. The controller of claim 14, further comprising a work surface identification module configured to identify the work surface based on one or more of slope, elevation, position, volume, and terrain composition.

16. The controller of claim 14, wherein the volume constraint module further defines the machine load limits to include a maximum load limit and a minimum load limit of an associated machine implement.

17. The controller of claim 16, wherein the volume constraint module further defines the maximum load limit based on one or more of a slope of the pass target, a slope of the work surface, a relative depth of the work surface, and a hardness of the work surface.

18. The controller of claim 16, wherein the first end of the pass target corresponds to an alignment gap of the work surface and the second end of the pass target corresponds to a crest of the work surface, the volume constraint module further defining the minimum load limit based on a desired minimum load at the crest.

19. The controller of claim 16, wherein the volume constraint module defines the maximum load limit and the minimum load limit for each primitive.

20. The controller of claim 16, wherein the volume constraint module further defines the maximum load limit by an upper envelope and the minimum load limit by a lower envelope, each of the upper envelope and the lower envelope being calculated in part by a sum of positive volume differentials extending through the pass target.

\* \* \* \* \*